March 26, 1963 C. W. JONES 3,083,275
SHORT CIRCUITING CUTOUT SWITCH FOR TRACTORS
Filed June 24, 1960 2 Sheets-Sheet 1

INVENTOR.
CHARLES W. JONES
BY
*Robert A. Sloman*
ATTORNEY

March 26, 1963     C. W. JONES     3,083,275
SHORT CIRCUITING CUTOUT SWITCH FOR TRACTORS
Filed June 24, 1960     2 Sheets-Sheet 2

INVENTOR.
CHARLES W. JONES
BY
Robert A. Sloman
ATTORNEY

United States Patent Office 3,083,275
Patented Mar. 26, 1963

3,083,275
SHORT CIRCUITING CUTOUT SWITCH
FOR TRACTORS
Charles W. Jones, Galion, Ohio
Filed June 24, 1960, Ser. No. 45,255
4 Claims. (Cl. 200—61.5)
(Filed under Rule 47(b) and 35 U.S.C. 118)

This invention relates to a safety device for tractors, motorcycles, other farm equipment and motors in operation and more particularly to a short circuit engine cutout switch.

With farm tractors one often reads of them tipping over or tipping backward over the driver causing serious injury or possible death. This is usually produced by a situation where the tractor has a great amount of power, as being in low gear and wherein the object being towed or pulled, such as a plow exerts an excessive resistance to movement with the result that the front end of the tractor rises up and the tractor continues and rolls over backward onto the operator. A somewhat less dangerous situation is where the tractor rolls sidewise, since many times the operator can escape under these conditions.

It is the primary object of this invention to overcome this danger by providing a short circuiting safety switch mechanism, whereby just as soon as the tractor begins to tip, or tilt more than the average up to as much as thirty-five to fifty-five degrees from the horizontal, the safety short circuiting switch will be activated for cutting out the engine ignition system and stopping the tractor before it has a chance to roll or tip over.

It is another object of the present invention to provide a short circuiting engine cut-out switch for a tractor employing a series of right angularly related bodies suitably bracketed to the vehicle frame with each body carrying a movable ball and with the bodies inclined laterally or rearwardly upwardly, at an acute angle in the range of thirty-five to fifty-five degrees. Suitable contacts are provided at the outer ends of each of the said bodies, adjacent the bottom wall thereof connected with terminals, interconnected into the ignition system. On tipping of the tractor or other vehicle rearwardly, or to the left or to the right, at least one of the conductive balls within the respective body will roll outwardly for engagement with one of the contacts and corresponding portion of the body wall so arranged in an electrical circuit for short circuiting the vehicle ignition system.

It is a further object to provide a series of right angularly related conductive bodies for the present switch together with a wiring system connected into the vehicle ignition system and having a series of branches respectively joined to terminals at the outer end portions to each of the respective bodies whereby movement of the corresponding conductive ball of a particular body into engagement with the said contact and a portion of the body housing effects a short circuiting of the engine ignition for cutting out the same, stopping further tipping movement of the tractor.

These and other objects will be seen from the following specification and claims in conjunction with the appended drawings in which:

Figure 1:
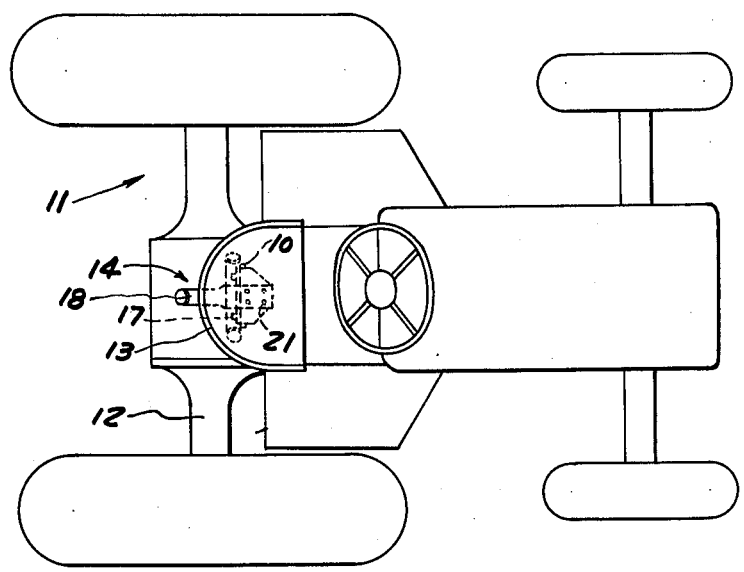
FIG. 1 is a schematic plan view of a tractor embodying the present safety short circuiting switch.
Figure 2:
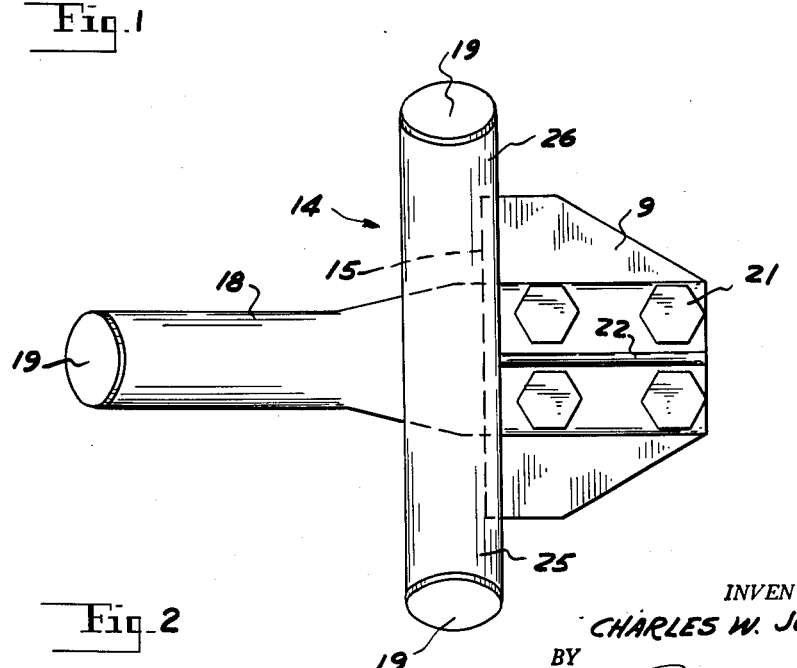
FIG. 2 is a plan view on an enlarged scale of the present short circuiting engine cutout switch.

It will be understood that the above drawings merely illustrate a preferred embodiment of the invention and that other embodiments are contemplated within the scope of the claims hereafter set forth.

Referring to the drawings the tractor or other vehicle is generally indicated at 11 which has a conventional engine ignition system and a body frame, a rear axle 12, and a seat 13 conventionally located centrally of and substantially above said axle.

The present safety short circuiting engine cutout switch is preferably arranged upon the longitudinal axis of the tractor and preferably adjacent the rear axle, as shown in FIG. 1, being directly below the seat 13. This gives the present short circuiting switch the maximum effectiveness, said switch being generally indicated by the numeral 14.

Figure 3:
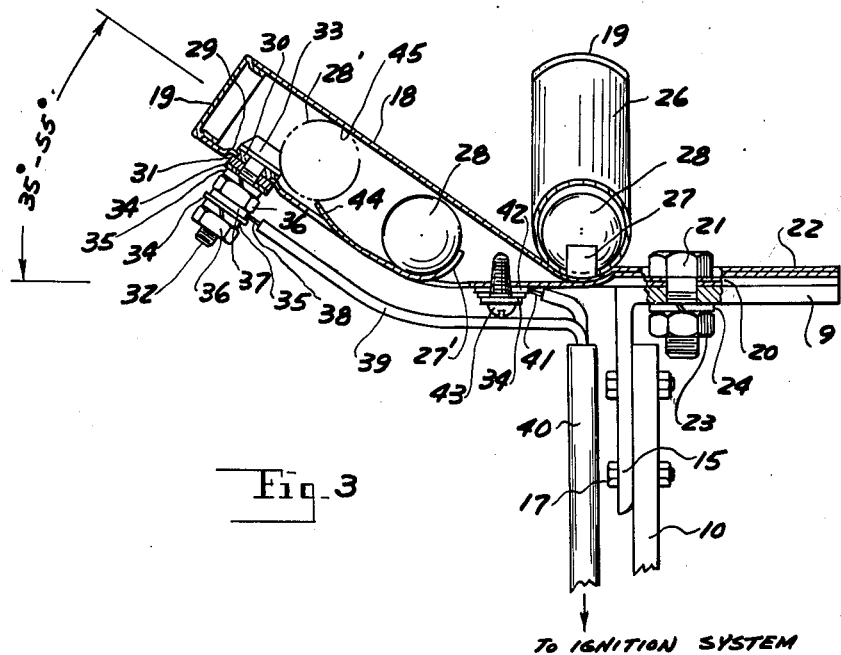
FIG. 3 is a longitudinal section of the present short circuiting switch, being for illustration, taken on line 3—3 of FIG. 4.

A mounting bracket is provided for the present switch which includes the upright angle plate 15, apertured at 16 for securing by bolts 17 to some portion of the vehicle frame 10 as shown in FIG. 3, being located on the longitudinal axis of the vehicle frame and preferably below the seat 13, as shown in FIG. 1, said angle plate including the horizontally disposed platform 9.

A first tubular body of conductive material as at 18 extends longitudinally and rearwardly of the said bracket, centrally of the tractor frame. The forward end portion of body 18 is flattened as at 20, overlies and is secured by bolts 21 to the top surface of bracket plate 9 upon opposite sides of the reinforcing elongated ridge 22 which is formed in the flattened tubular portion 20 and wherein a suitable lockwasher 24 is employed in conjunction with the securing nut 23. The said tubular body extends rearwardly of the bracket and is inclined upwardly at an acute angle within the range of thirty-five to fifty-five degrees for illustration. The outer open end of the body is closed by the closure cap 19 which is removably projected into the outer end thereof, finishing the assembly but at the same time providing easy access to the interior of the said body.

A second tubular body extends transversely of the longitudinal axis of the tractor frame, as well as transversely of the first body 18 and is fixedly secured to body 18 adjacent the flattened portion thereof by the welds 27.

This second tubular body includes a pair of oppositely arranged upwardly extending inclined ends 25 and 26 of tubular electrically conductive construction. Their outer ends are also closed by the caps 19.

A conductive steel ball 28 is movably positioned within each of the tubular body elements. These balls are normally supported at the inner and lowermost ends of the respective body as by the upwardly curved retaining flange 27' shown in FIG. 4 which is normally struck upwardly from a portion of the tubular body to thus limit the inward position of the respective balls. This structure is also shown in FIG. 3. The outer end portions of each of the tubular bodies 18, 25 and 26 on their bottom surfaces are flattened inwardly as at 29 with each flattened area apertured to receive the insulating bushings 30 and 31. For illustration Textolite bushings and washers may be employed. Threaded terminals 32 having tapered heads 33 positioned within the respective bodies 18, 25 and 26 project outwardly through the said bushings and washers respectively at 30 and 31 and are secured in position by nuts 36 with suitable brass washer 34 and lockwasher 35 interposed, as best illustrated in FIG. 3.

The looped end 37 of branch wire 38 insulated as at 39, is mounted over and upon the terminal 32 against nut 36 and is secured thereon by the additional nut 36 with brass washer 34 and lockwasher 35 interposed, completing the terminal assembly as shown in FIG. 3. This same terminal arrangement is provided for upon the outer ends of each of the three tubular bodies 18, 25 and 26.

The present invention contemplates electrical circuit 40, as shown in FIG. 3 adapted for connection into the engine ignition system and wherein one of the wires in said circuit includes three individual branches 39 respectively joined to the terminals 32. There is a second wire in said circuit indicated at 41 whose looped end 42 is secured by the fastener screw 43 and washer 34 to an inner base portion of tube 18, for illustration.

Referring to FIG. 3 in operation, should the tractor or vehicle begin to tip upwardly from its front end approaching an angle to a horizontal in the range, for illustration, from thirty-five to fifty-five degrees, the conductive ball 28 loosely positioned within the body 18 would begin to roll outwardly until it engages the tapered contact surface 33 on terminal 32, as indicated in dotted lines at 28'.

As shown in FIG. 3, the upper portion of the ball is normally spaced from the top wall of the body 18. To operate as contemplated it is necessary that the ball 28 not only engage contact 33 on said terminal but another portion of said ball must engage the surface of the tubular body 18 such as the top surface in order to complete the electrical circuit through the body and to thus short circuit the engine ignition through circuit wires 38—40 and including the return wire 41—42.

In the preferred embodiment, a portion of the bottom wall of each of the respective bodies 18, 25 and 26 is slitted and curved upwardly defining the lifts 44 which guide the ball 28 so as to simultaneously engage contact 33 as well as an interior wall portion of the body 18 for illustration.

This completes an electrical circuit in effect short circuiting the engine ignition system in turning off the engine and preventing the tractor or other vehicle from completing its turning over under the drive of the rear axle.

The body 18 and the lift 44 is so constructed as shown in FIG. 3 as to tend to retain the ball 28' in the dotted line position shown against accidental dislodgment to prevent the engine from restarting. If the lift 44 is used for this purpose, so that in effect it loosely retains the ball in the outermost position shown, to release the ball when the tractor has returned to normal position it may be necessary to remove the cap 19 and to press the ball inwardly so that it rolls down to the original position shown in FIG. 3, as resting against the stop 27'.

Figure 4:
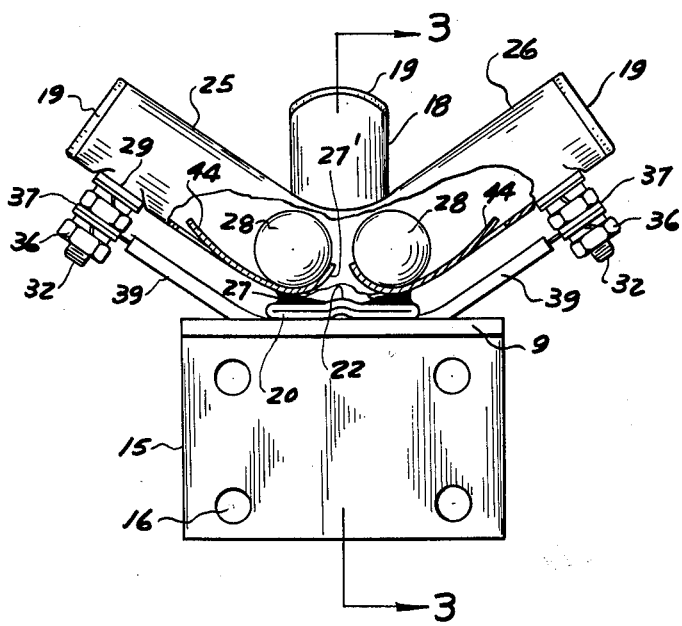
FIG. 4 is a front elevational view of the present switch partly broken away and sectioned for illustration, being a view from the right end of FIG. 2.

Should the tractor or vehicle begin to tip either to the right or left within the range of thirty-five to fifty-five degrees from the horizontal, the corresponding ball 28 shown in FIG. 4 would roll outwardly to engage the internal contact of the terminal 32 as above described with respect to FIG. 3. Accordingly there is provided in the present invention a short circuiting engine cut out switch for a tractor or other vehicle which is effective for turning off the vehicle engine if the tractor begins to tip either to the right or to the left. In the present construction each of the balls 28 in its respective guiding body 18, 25 and 26 operates independently of the other. Accordingly, under certain conditions, it would be possible for more than one ball to move into contact with the corresponding terminal. In any event the net result would be a short circuiting of the vehicle ignition system.

The angularity of the inclination of the bodies 18, 25 and 26 has been shown at thirty-five to fifty-five degrees as being a relatively dangerous angle. It is contemplated that this angularity could be varied to suit the particular conditions contemplated.

The primary object is thus achieved, namely the operation of the short circuiting switch upon the electrical ignition system of the tractor or other vehicle so that the engine is stopped and thus there is no longer sufficient power due to engine operation for turning the tractor over.

The removable caps also provide a means of manually disengaging the balls 28 respectively, should one of them accidentally move into short circuiting position as when the vehicle rides over a bump or hits an obstruction.

Having described my invention, reference should now be had to the following claims.

I claim:

1. A short circuiting engine cutout switch for a tractor comprising a first tubular body of conductive material mountable upon a support extending longitudinally thereof, secured thereto and including an upwardly and rearwardly inclined end, a second tubular body of a conductive material extending transversely centrally secured to said first body and including oppositely extending upwardly inclined ends, a terminal mounted in insulated relation upon and extending normally outward through the bottom of each of said bodies adjacent its outer extremity and including a contact on the interior of the body, an electric circuit including a first wire including three branches individually connected to each of said terminals respectively, a short circuit second wire grounded into one of said tubular bodies, a conductive ball loosely positioned within each of said bodies normally at their respective inner ends, at least one of said balls adapted to roll toward the outer end of its body for short circuiting engagement with said terminal contact and a portion of said tube on appreciable tilting of said bodies from a normal level, and a ball guide curved upwardly from the bottom wall towards the outer end of each body for guiding the ball into simultaneous engagement with said terminal contact and the opposing wall of said body.

2. A short circuiting engine cutout switch for a tractor comprising a first tubular body of conductive material mountable upon a support extending longitudinally thereof, secured thereto and including an upwardly and rearwardly inclined end, a second tubular body of conductive material extending transversely centrally secured to said first body and including oppositely extending upwardly inclined ends, a terminal mounted in insulated relation upon and extending normally outward through the bottom of each of said bodies adjacent its outer extremity and including a contact on the interior of the body, an electric circuit including a first wire including three branches individually connected to each of said terminals respectively, a short circuit second wire grounded into each of said tubular bodies, a conductive ball loosely positioned within each of said bodies normally at their respective inner ends, at least one of said balls adapted to roll toward the outer end of its body for short circuiting engagement with said terminal contact and a portion of said tube on appreciable tilting of said bodies from a normal level, and a stop upon the interior of each body adjacent its lower end supportably engaging said balls in inoperative position, and a ball guide curved upwardly from the bottom wall towards the outer end of each body for guiding the ball into simultaneous engagement with said terminal contact and the opposing wall of said body.

3. A short circuiting engine cutout switch for a tractor comprising a first tubular body of conductive material mountable upon a support extending longitudinally thereof, secured thereto and including an upwardly and rearwardly inclined end, a second tubular body of conductive material extending transversely centrally secured to said first body and including oppositely extending upwardly inclined ends, a terminal mounted in insulated relation upon and extending normally outward through the bottom of each of said bodies adjacent its outer extremity and including a contact on the interior of the body, an electric circuit including a first wire including three branches individually connected to each of said terminals respectively, a short circuit second wire grounded into one of said tubular bodies, a conductive ball loosely positioned within each of said bodies normally at their respective inner ends, at least one of said balls adapted to roll toward the outer end of its body for short circuiting engagement with said terminal contact and a portion of said tube on appreciable tilting of said bodies from a normal level, and a ball guide curved upwardly from the bottom wall towards the outer end of each body for guiding the ball into simultaneous engagement with said terminal contact and the opposing wall of said body, the free end of said guide being spaced from said contact a distance less than the ball diameter for retaining said ball therebetween in short circuiting position.

4. A short circuiting engine cutout switch for a tractor comprising a first tubular body of conductive material mountable upon a support extending longitudinally thereof, secured thereto and including an upwardly and rearwardly inclined end, a second tubular body of conductive material extending transversely centrally secured to said first body and including oppositely extending upwardly inclined ends, a terminal mounted in insulated relation upon and extending normally outward through the bottom of each of said bodies adjacent its outer extremity and including a contact on the interior of the body, an electric circuit including a first wire including three branches individually connected to each of said terminals respectively, a short circuit second wire grounded into one of said tubular bodies, a conductive ball loosely positioned within each of said bodies normally at their respective inner ends, at least one of said balls adapted to roll toward the outer end of its body for short circuiting engagement with said terminal contact and a portion of said tube on appreciable tilting of said bodies from a normal level, a ball guide curved upwardly from the bottom wall toward the outer end of each body for guiding the ball into simultaneous engagement with said terminal contact and the opposing wall of said body, the free end of said guide being spaced from said contact a distance less than the ball diameter for retaining said ball therebetween in short circuiting position, and a removable closure cap secured onto the outer end of each body for manual release of said ball.

References Cited in the file of this patent
UNITED STATES PATENTS

| | | |
|---|---|---|
| 1,761,681 | Reis et al. | June 3, 1930 |
| 1,837,533 | Colvin | Dec. 22, 1931 |
| 2,296,053 | Porter et al. | Sept. 15, 1942 |
| 2,757,749 | Cooper et al. | Aug. 7, 1956 |
| 2,950,365 | Bolstad | Aug. 23, 1960 |
| 2,986,616 | Hanserd | May 30, 1961 |